United States Patent
Kenney

(10) Patent No.: US 6,580,771 B2
(45) Date of Patent: Jun. 17, 2003

(54) SUCCESSIVE USER DATA MULTIPATH INTERFERENCE CANCELLATION

(75) Inventor: Thomas J. Kenney, San Diego, CA (US)

(73) Assignee: Nokia Corporation, Espoo (FI)

( * ) Notice: Subject to any disclaimer, the term of this patent is extended or adjusted under 35 U.S.C. 154(b) by 28 days.

(21) Appl. No.: 09/822,897

(22) Filed: Mar. 30, 2001

(65) Prior Publication Data

US 2002/0172265 A1 Nov. 21, 2002

(51) Int. Cl.[7] .............................................. H04L 1/02
(52) U.S. Cl. ...................... 375/346; 375/148; 455/296; 455/63; 455/501
(58) Field of Search ................................ 375/148, 144, 375/346, 347, 349; 455/296, 63, 278.1, 295, 303, 501

(56) References Cited

U.S. PATENT DOCUMENTS 5,553,062 A * 9/1996 Schilling et al. ............ 370/479

* cited by examiner

Primary Examiner—Stephen Chin
Assistant Examiner—Kevin Kim
(74) Attorney, Agent, or Firm—Milan I. Patel

(57) ABSTRACT

A wireless receiver stores one or more frames of received data and, during an initial demodulation, resolves each individual path for the multipath channel and estimates (pilot) channel parameters in order to process the received traffic, then preferably decodes the processed traffic to produce an estimate of the transmitted data. The estimated data is re-encoded exactly as encoded by the transmitter, then scaled and time-shifted utilizing complex weights and timing estimates garnered during the initial demodulation process. For each resolvable path, all other paths are time-aligned to reproduce the interference detected in the original received signal, with the resulting information employed to cancel the interference from other paths. Once all paths have had interference from other paths canceled, the results are combined and again decoded, re-encoded and reprocessed iteratively until residual interference and/or decoding errors are eliminated.

12 Claims, 4 Drawing Sheets

SUCCESSIVE USER DATA MULTIPATH INTERFERENCE CANCELLATION

TECHNICAL FIELD OF THE INVENTION

The present invention is directed, in general, to wireless communications systems and, more specifically, to cancellation of interference from wireless communications within multipath channels.

BACKGROUND OF THE INVENTION

In wireless channels, where signals can arrive at different times following different paths, the received signals can experience large amplitude and phase variations due to the interference of the different paths. This phenomena is referred to as multipath fading, and the effect is a critical parameter for consideration in receiver design. For terrestrial mobile telephony, multipath fading may dictate the entire system capacity and throughput rate.

Terrestrial wireless signals transmitted from or to a mobile station may be reflected from the terrain, fixed or mobile objects in the propagation path such as buildings or vehicles, or from a discontinuity in the atmosphere. If the energy of the reflected wireless signal is not significantly absorbed and/or attenuated, creating a plurality of different propagation paths for the wireless signals between the transmitter and receiver, referred to as multipath propagation, which allows the wireless signals to "bend" around corners and propagate beyond terrain features and objects obstructing the line-of-sight between the base and mobile stations.

Three problems associated with multipath propagation for mobile stations include (1) the delay spread of the received signal, (2) the Rayleigh fading in received signal strength caused by varying phase shifts between different paths, and (3) the varying frequency modulation due to the Doppler shift between various propagation paths. The fact that propagation paths for reflected signals are longer than the direct propagation path from the transmitter to the receiver (e.g., from the base station to the mobile station) gives rise to signal delays and, because various paths lead to slightly different arrival times, the received signal "spreads." Rayleigh fading results from differences between the phase and amplitude of the reflected wireless signals relative to the phase of a directly propagating signal, attenuating the signal strength at the receiving end (e.g., reception of two signals propagated along two different paths and arriving with a phase difference of 180 degrees results in cancellation in the receiver). Doppler shift is caused by the movement of the mobile station—or a vehicle or other reflecting object—in relation to the base station, such that the mean frequencies of both the received reflected signal and of the directly propagated signal deviate from the mean frequency of the transmitted signal by a different amount and in a different direction.

In general, multipath fading causes wide variations in received signal amplitudes, and much effort has been expended in attempting to mitigate the impact of multipath fading. More specifically, multipath fading limits the signal strength of the pilot channel as a function of total interference density in the carrier band for contemporary systems, requiring the largest percentage of transmitted power to be allocated to the pilot signal.

Moreover, while interference cancellation for an unmodulated pilot channel is straightforward, cancellation of "self inter-ference" in the data bearing channel when transmit power allocated to the data bearing channel exceeds that allocated to the pilot channel is substantially more complicated.

There is therefore a need in the art for a technique of eliminating multipath interference from wireless signals received via a multipath channel without regard to whether the interfering signals are unmodulated or modulated.

SUMMARY OF THE INVENTION

To address the above-discussed deficiencies of the prior art, it is a primary object of the present invention to provide, for use in a wireless communications system, a wireless receiver which stores one or more frames of received data and, during an initial demodulation, resolves each individual path for the multipath channel and estimates (pilot) channel parameters in order to process the received traffic, then preferably decodes the processed traffic to produce an estimate of the transmitted data. The estimated data is re-encoded exactly as encoded by the transmitter, then scaled and time-shifted utilizing complex weights and timing estimates garnered during the initial demodulation process. For each resolvable path, all other paths are time-aligned to reproduce the interference detected in the original received signal, with the resulting information employed to cancel the interference from other paths. Once all paths have had interference from other paths canceled, the results are combined and again decoded, re-encoded and reprocessed iteratively until residual interference and/or decoding errors are eliminated.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless access network.

Figure 1:
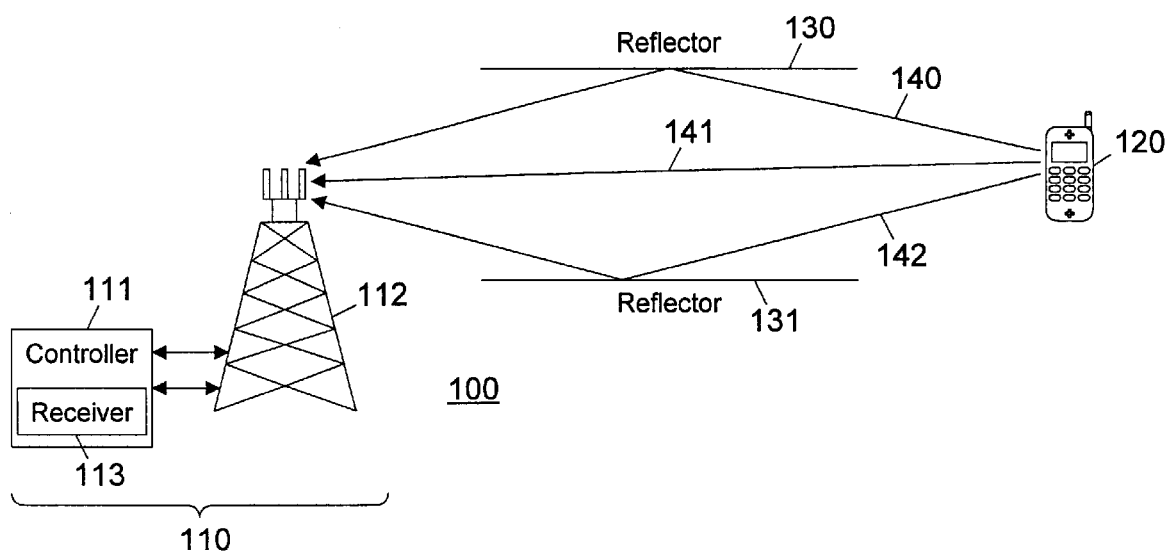
FIG. 1 illustrates a wireless communications system employing successive user data multipath interference cancellation according to one embodiment of the present invention.

FIG. 1 illustrates a wireless communications system employing successive user data multipath interference cancellation according to one embodiment of the present invention. Wireless communications system 100 includes a base transmitter station (BTS) 110 and a remote station 120 which communicate via wireless signals. Although depicted in the exemplary embodiment as a telephone, remote station 120 may be any wireless communication device, including without limitation a personal digital assistant (PDA) or a transceiver providing wireless Internet access. Although useful in any type of wireless communications system, the present invention will be particularly advantageous to data centric wireless communications systems, such as systems for providing broadband wireless Internet access.

Base transceiver station 110 includes an antenna or antenna array 111 and a controller 112 regulating transmission and reception of wireless signals to and from remote station 120 in accordance with the known art. Controller 112 includes a receiver 113 which utilizes successive user data multipath interference cancellation to improve performance in accordance with the present invention. Receiver 113 is preferably a "rake" receiver, a receiver having multiple "fingers" and utilizing offsets of a common spreading code to receive and combine several multipath (time delayed) signals to effectively utilize time diversity in overcoming deep fades. Although the exemplary embodiment illustrates the receiver as being located within the base transceiver station for the purposes of explaining the present invention, both remote station 120 and base transceiver station 110 each preferably include both transmission and reception capabilities, and a receiver located within remote station 120 may be similarly equipped to employ successive user data multipath interference cancellation.

In the exemplary embodiment employed to explain the present invention, two reflector objects 130 and 131 create indirect propagation paths between the remote station 120 and the base transceiver station 110. As noted above, reflector objects 130 and 131 may be a terrain feature, building, vehicle, a discontinuity in the atmosphere, or any other fixed or mobile object reflecting the wireless signals transmitted between remote station 120 and base transmitter station 110 without substantially complete attenuation of the signal strength. As a result of reflector objects 130 and 131, three independent resolvable propagation paths 140, 141 and 142 exist within—and form—the multipath channel between remote station 120 and base transceiver station 110. Those skilled in the art will recognize, however, that the present invention may be employed for a multipath channel having any number of resolvable propagation paths between a transmitter and receiver which is greater than one.

The present invention eliminates multipath interference from signals transmitted via the multipath channel between remote station 120 and base transceiver station 110. Assume that a transmitted signal from remote station 120 to base transceiver station 110 may be given as:

$$x(t) = Re[u(t)e^{j2\pi f_c t}]$$

where u(t) is the desired modulated signal pulse and $f_c$ is the carrier frequency. If the multipath channel (propagation paths 140, 141 and 142) is assumed in the general case to have L paths, then the received signal after passing through the multipath channel has a lowpass equivalent form of:

$$x(t) = \sum_{l=1}^{L} \beta_l(t) e^{-j\theta_l(t)} u[t - \tau_l(t)]$$

where $\beta_l(t)$ is the channel path gain, $\theta_l(t)$ is the channel phase term, $\tau_l(t)$ is the channel delay, and where noise is ignored for simplicity and brevity. For a specific path within the general multipath channel case, there exists L-1 other paths which may contribute interference. If one path is demodulated based on perfectly known complex channel gain and timing, the demodulated signal is given by:

$$x(t) = u(t) + \sum_{l=1}^{L} \beta'_l(t) e^{-j\theta'_l(t)} u[t - \tau'_l(t)]$$

where $\beta'_l(t)$, $\theta'_l(t)$, $\tau'_l(t)$ are channel path gain, a channel phase term, and channel delay, respectively, and result from the demodulation of one path. The above expression may be rewritten for compactness as follows:

$$x(t) = u(t) + \sum_{l=1}^{L} \gamma'_l(t) u[t - \tau'_l(t)]$$

where $\gamma'_l(t)$ is the complex channel gain. Therefore, the second term in the above expression is due completely to interference. This expression, however, is for only one path or "finger" of the multipath channel. A similar term, with different channel gains and delays, exists for each of the resolvable paths between the transmitter and receiver. In the present invention, multipath interference is removed from the received signals corresponding to each of the resolvable paths, as described in further detail below.

Figure 2:
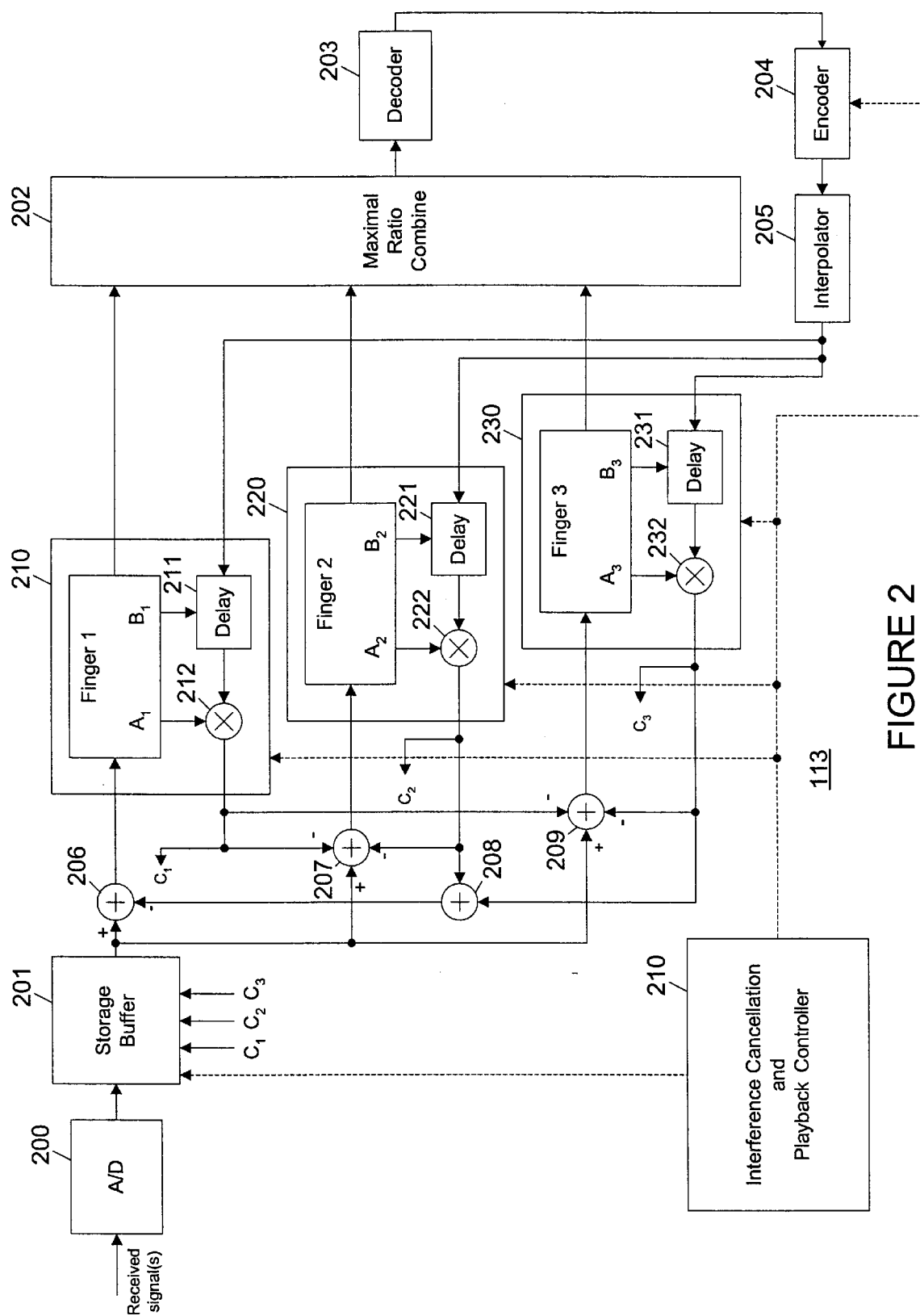
FIG. 2 illustrates in greater detail a receiver in the exemplary wireless communications system employing successive user data multipath interference cancellation according to one embodiment of the present invention.

FIG. 2 illustrates in greater detail a receiver in the exemplary wireless communications system employing successive user data multipath interference cancellation according to one embodiment of the present invention. Receiver 113 experiences multipath fading with three independent resolvable paths as illustrated in the exemplary embodiment depicted in FIG. 1. The received wireless signals for one or more frames of data are down converted, if necessary, and sampled, preferably at a minimum of twice the "chip" or bit rate of the data transmission, by receiver 113. The sampled data is converted by analog-to-digital (A/D) converter 200 then stored within storage buffer 201.

Demodulators 210, 220 and 230 within receiver 113, each corresponding to one finger, conduct channel identification and estimation on the stored data in accordance with the known art, resolving each path and determining approximations for all relevant system parameters, such as automatic frequency control (AFC), automatic gain control (AGC), multipath complex channel gain and timing epoch. In particular, the estimated complex channel gain $\hat{\gamma}'_i(t)$ and estimated complex channel delay $\hat{\tau}'_i(t)$ (represented respectively in FIG. 2 as $A_1$ and $B_1$ for Finger 1, $A_2$ and $B_2$ for Finger 2, and $A_3$ and $B_3$ for Finger 3) for each resolvable path. Some mechanism, such as the pilot channel in IS-95 systems, should be provided for estimating complex channel gain and delay and other system parameters.

The traffic (or other data-bearing channel) is processed as normal from correlation within demodulators 210, 220 and 230 to decoding based on the estimated parameters within decoder 203. Since the data is stored in the exemplary embodiment, channel identification and estimation may be performed concurrently for all resolvable paths to save time and hardware resources.

The outputs of each demodulator 210, 220 and 230 are combined and passed to decoder 203. The decoded data from decoder 203, which is an estimate of the transmitted information bits, is then re-encoded utilizing encoder 204 and interpolator 205, which operate a manner identical to the encoding mechanism within transmitter 120 which transmitted the original wireless signals received by receiver 113. The re-encoded data estimate is then time shifted by delay units 211, 221 and 231 and scaled by mixers/signal multipliers 212, 222 and 232 utilizing the complex weights and timing estimates $\hat{\gamma}'_1(t)$ and $\hat{\tau}'_1(t)$ ($A_1$ and $B_1$ in FIG. 2), $\hat{\gamma}'_2(t)$ and $\hat{\tau}'_2(t)$ ($A_2$ and $B_2$ in FIG. 2), and $\hat{\gamma}'_3(t)$ and $\hat{\tau}'_3(t)$ ($A_3$ and $B_3$ in FIG. 2) attained in the initial demodulation process for each of the resolvable paths to generate estimated channel symbols $\hat{d}[\hat{\gamma}'_i(t), \hat{\tau}'_i(t)]$ for each path. Each estimated channel symbol $\hat{d}[\hat{\gamma}'_i(t), \hat{\tau}'_i(t)]$ is dependent on the path parameters $\hat{\gamma}'_i(t)$ and $\hat{\tau}'_i(t)$ for the respective path. Thus, estimated channel symbol $\hat{d}[\hat{\gamma}'_1(t), \hat{\tau}'_1(t)]$ (represented by $C_1$ in FIG. 2) is generated by delay unit 211 and signal multiplier 212 utilizing $\hat{\gamma}'_1(t)$ and $\hat{\tau}'_1(t)$, estimated channel symbol $\hat{d}[\hat{\gamma}'_2(t), \hat{\tau}'_2(t)]$ (represented by $C_2$ in FIG. 2) is generated by delay unit 221 and signal multiplier 222 utilizing $\hat{\gamma}'_2(t)$ and $\hat{\tau}'_2(t)$, and estimated channel symbol $\hat{d}[\hat{Y}'_3(t), \hat{\tau}'_3(t)]$ (represented by $C_3$ in FIG. 2) is generated by delay unit 231 and signal multiplier 232 utilizing $\hat{\gamma}'_3(t)$ and $\hat{\tau}'_3(t)$. These values are stored storage buffer 203.

For each individual finger or path of the multipath channel, the other L-1 fingers are time aligned utilizing whole and fractional delay approaches, and are altered so that the receiver-created, re-encoded estimated data signal has the same complex weight and timing as that of the interference component from the corresponding path on the original data for the subject path. These estimated interference signals are then subtracted from the original data for the subject finger (retrieved from storage buffer 203) utilizing signal adders 206, 207, 208 and 209, removing the interference term for each other path from the signal for the subject finger and producing one path from which the interference to the transmitted signal contributed by the remaining paths has been removed. This process is repeated for all other fingers or paths, utilizing the original data and removing the estimated interference from other paths on the subject path until the original received signals for all resolvable paths have had estimated interference due to interfering paths removed.

The results for all L paths are then combined in unit 202 utilizing known techniques such as maximal ratio combining. The combined output is sent to decoder 203, which produces an estimate of the transmitted information bits. Since the decoding of the interference data may result in some decoding errors in the process described above, a "residual" interference term will remain. To reduce this residual interference term, the data is successively processed as described above. The same process described above is repeated one or more times for the output of decoder 203, where the original stored sampled data is replaced at each iteration with the original data minus the estimated interference component. Each iteration produces a more accurate estimation of the multipath interference and a smaller residual interference.

If decoding of the received data were perfect on the first pass through the process described above, the "self data" interference would have been removed by the process. In practical systems, however, decoding errors require the entire process to be repeated utilizing the new data set. Iteration allows the receiver 113 to asymptotically remove the interference from the original data until the decoded data has not errors, at which time the process may be stopped. The number of passes or iterations required for satisfactory decoding is a design choice which should be made in view of available error correction capabilities. The process and the number of iteration is controlled by an interference cancellation and playback controller 210.

Figure 3:
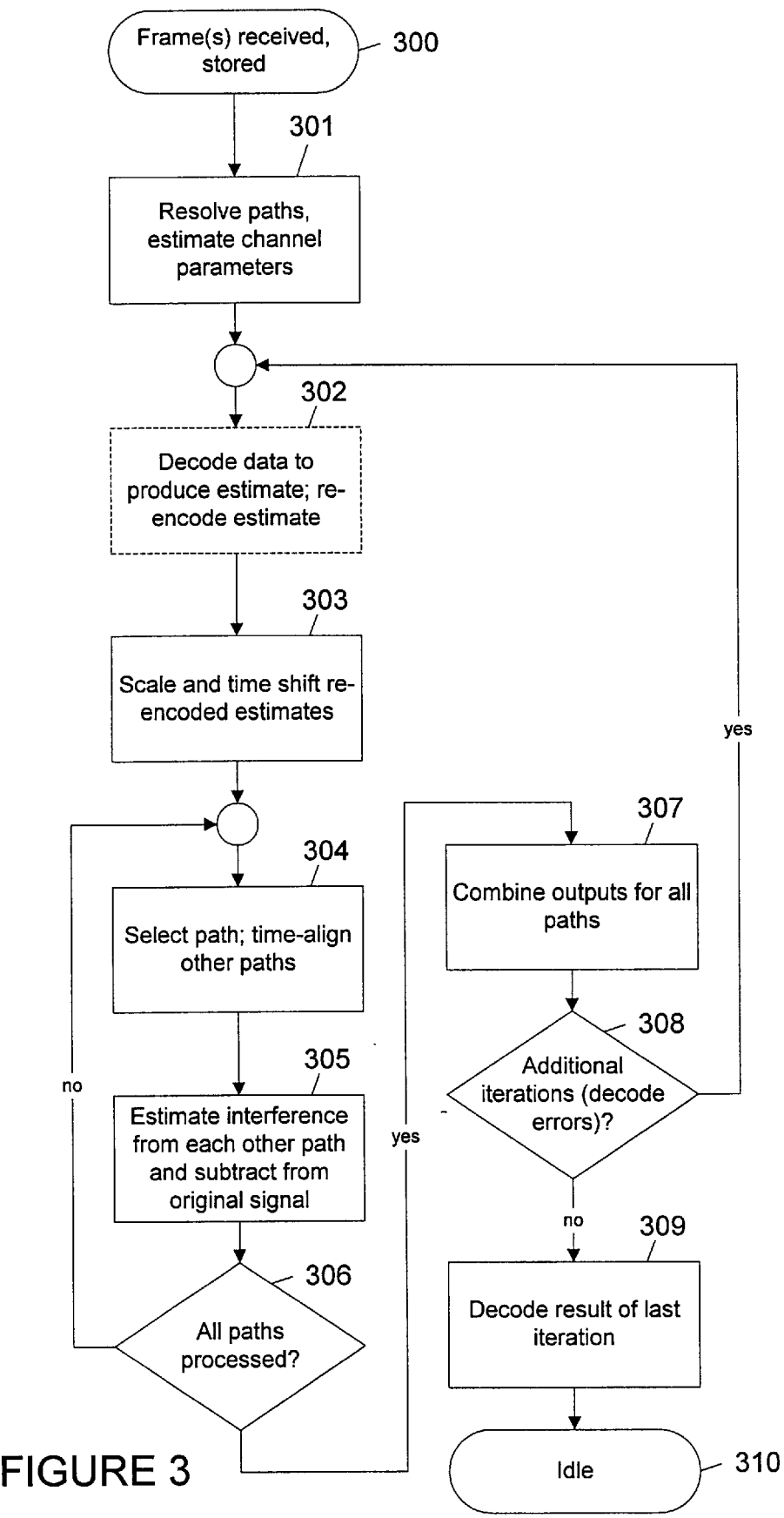
FIG. 3 is a high level flow diagram illustrating the operation of the exemplary wireless communications system employing successive user data multipath interference cancellation according to one embodiment of the present invention.

FIG. 3 is a high level flow diagram illustrating the operation of the exemplary wireless communications system employing successive user data multipath interference cancellation according to one embodiment of the present invention. The process begins with receipt and storage (step 300) of one or more frames of data transmitted within a multipath channel having two or more resolvable paths. During an initial demodulation, each path or finger within the multipath channel is resolved, and channel parameters including multipath complex gain and timing epoch are estimated (step 301) utilizing an available estimation means such as a pilot channel provided as a reference for that purpose.

The received data is decoded (step 302) utilizing the estimated channel parameters to obtain an estimate of the transmitted data which, most likely, will include decoding errors and/or residual interference. The estimate of the transmitted data is then re-encoded in a manner identical to the encoding scheme employed by the transmitter. This step is optional, as described in further detail below.

The re-encoded data estimate is then scaled and time-shifted (step 303) utilizing the complex weights and timing estimates garnered in the initial demodulation. Each resolvable path within the multipath channel is individually selected and the remaining paths are time-aligned (step 304). An estimate of the interference by each of the remaining paths on the signal in the selected path is generated and subtracted from the original, received signal (step 305) to remove that interference. Each path is selected in turn (either sequentially by a single processing unit or in parallel processing units) until all paths are determined to have been processed (step 306).

The outputs for the interference cancellation for each of the individual paths are combined (step 307) and a determination is made as to whether additional iterations are required (step 308) based on the selected design parameter for the number of iterations to be employed and/or the existence of any residual interference or decoding errors. If additional iterations need to be performed, the process returns to step 302 and repeats the cycle of steps 302–308. Once all required iterations are completed, the result of the last iteration is decoded (step 309) and the process becomes idle (step 310) until additional frames or data are received and stored.

Figure 4:
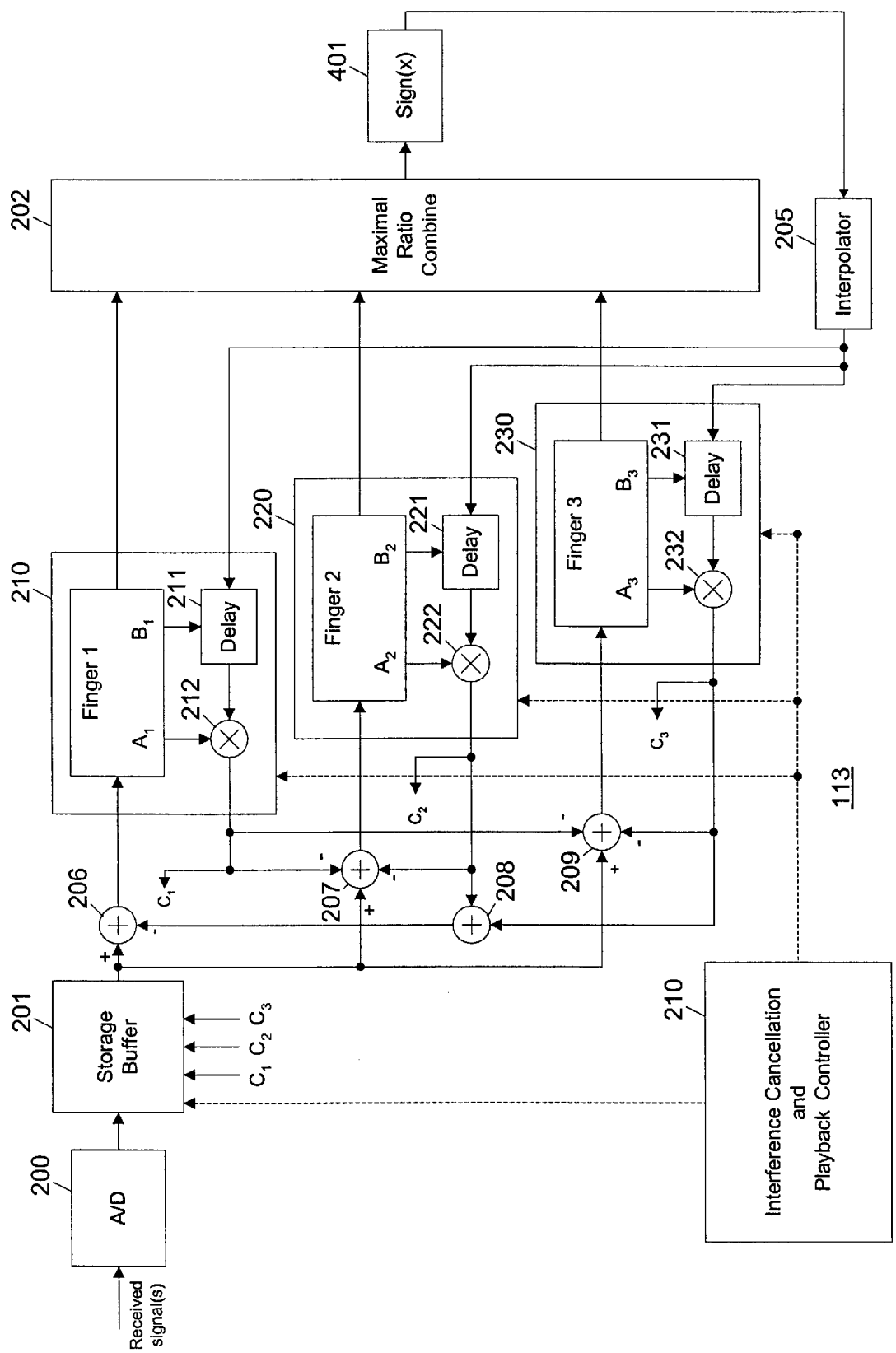
FIG. 4 illustrates in greater detail a receiver in the exemplary wireless communications system employing successive user data multipath interference cancellation according to another embodiment of the present invention.

FIG. 4 illustrates in greater detail a receiver in the exemplary wireless communications system employing successive user data multipath interference cancellation according to another embodiment of the present invention. In this alternative embodiment, receiver 113 contains essentially the same structure and operates in essentially the same manner as the embodiment depicted in FIG. 2, exception that decisions are made on the actual symbol data (i.e., hard decisions) instead of decoding the data as shown in the embodiment of FIG. 2. Accordingly, the decoder in FIG. 2 is replaced by a sign unit 401 in FIG. 4, and the encoder in FIG. 2 is eliminated since encoding and decoding are not required. From a hardware perspective, this alternative embodiment is less complex. However, performance is sub-optimal and exhibits less improvements since coding gain is not utilized in the process of hard decision detection. Nonetheless performance improvement over existing solutions are afforded even with this alternative embodiment.

The present invention cancels interference in direct sequence spread spectrum (DSSS) receivers which are experiencing multipath fading from two or more resolvable paths. Stored received data is employed to extract information pertinent to removing interference in the original signal. The stored data is first "played" to estimate the transmitted symbols, in addition to obtaining system parameters such as timing, channel gain, and phase. Then, with (estimated) knowledge of the transmitted symbols, the original data is replayed and, using the estimated system parameters together with knowledge of the transmitted symbols, multipath interference terms are removed from each path. The process is repeated in iterative fashion, vastly improving the receiver's performance. For data centric receivers, where a large amount of power is dedicated to one user, the performance improvement may be substantial.

Consider, for example, an IS-95 system in which the signal u(t) in $$x(t) = u(t) + \sum_{l=1}^{L} \gamma_l'(t) u[t - \tau_l'(t)]$$

is comprised of a pilot signal (unmodulated carrier) plus a user specific voice or data signal. In such systems, many users simultaneously share the channel and demodulation or estimation of the transmitted data for each user is therefore required to remove the interference. Knowledge of the numbers of users and the data payload type is required for this purpose, either a priori or through estimation. In this case each user is allocated a small fraction of the signal power and, with current network designs, the largest percentage of transmit power is allocated to the pilot signal. In these systems interference cancellation of the pilot signal only is clearly prudent and, since the pilot is unmodulated, requires only straightforward processing.

By comparison, in a system such as HDR or 1XTREME, a single user may (or in some cases will) be the user on the channel at any one time. In such cases, all—or at least most—of the transmitted power is utilized for that single user, such that power allocated to the data bearing channel may exceed that of the pilot channel. In this case, the second term in the expression above is "self interference" and, utilizing the approach described herein, may be reduced to a level asymptotically approaching zero.

The present invention reduces, asymptotically to zero, the interference which results from a specific user's multipath components when two or more paths are resolved. This allows a mobile to operate with a lower signal strength for the pilot channel as a function of the total interference density in the carrier band (Ec/Io) than current mobiles in multipath channels, thereby improving total system performance.

Although the present invention has been described in detail, those skilled in the art should understand that they can make various changes, substitutions and alterations herein without departing from the spirit and scope of the invention in its broadest form.

What is claimed is:

1. For use in a wireless communications system, a portion of a receiver employed for successive user data multipath interference cancellation comprising:

a storage buffer capable of selectively storing samples from a wireless signal;

a plurality of demodulators each corresponding to one of a plurality of resolvable paths within a multipath channel in which said wireless signal is transmitted, each demodulator including a delay unit and a signal multiplier capable of being selectively employed to estimate interference from a corresponding resolvable path on a portion of said wireless signal transmitted along a selected path within said multipath channel;

a plurality of signal adders each capable of selectively subtracting said estimated interference on said wireless signal portion transmitted along said selected path from said wireless signal samples; and a controller capable of selectively causing, for each selected path within said multipath channel, said plurality of demodulators and said plurality of signal adders to perform an interference cancellation processing cycle in which said plurality of demodulators each estimate interference from said corresponding path on said wireless signal portion transmitted along said selected path, wherein each demodulators estimate complex gains and timing delays for interference from said corresponding path on said wireless signal transmitted along said selected path, and said plurality of signal adders each subtract said estimated interference on said wireless signal portion transmitted along said selected path from said wireless signal samples, each of said resolvable paths being selected in turn during said interference cancellation processing cycle until all resolvable paths have been selected, said controller capable of selectively causing said plurality of demodulators and said plurality of signal adders to iteratively perform said interference cancellation processing cycle on all paths within the multipath channel.

2. The receiver as set forth in claim 1 wherein at least one of said demodulators resolves each individual path for said multipath channel and estimates channel parameters for said multipath channel to process said wireless signal during said initial demodulation.

3. For use in a wireless communications system, a portion of a receiver employed for successive user data multipath interference cancellation comprising:
- a storage buffer capable of selectively storing samples from a wireless signal;
- a plurality of demodulators each corresponding to one of a plurality of resolvable paths within a multipath channel in which said wireless signal is transmitted, each demodulator including a delay unit and a signal multiplier capable of being selectively employed to estimate interference from a corresponding resolvable path on a portion of said wireless signal transmitted along a selected path within said multipath channel;
- a plurality of signal adders each capable of selectively subtracting said estimated interference on said wireless signal portion transmitted along said selected path from said wireless signal samples; and
- a controller capable of selectively causing, for each selected path within said multipath channel, said plurality of demodulators and said plurality of signal adders to perform an interference cancellation processing cycle in which
  - said plurality of demodulators each estimate interference from said corresponding path on said wireless signal portion transmitted along said selected path, wherein each demodulator produces an estimate of symbols transmitted on said wireless signal based on complex gains and timing delays for interference from said corresponding path on said wireless signal transmitted along said selected path, and
  - said plurality of signal adders each subtract said estimated interference on said wireless signal portion transmitted along said selected path from said wireless signal samples,
- each of said resolvable paths being selected in turn during said interference cancellation processing cycle until all resolvable paths have been selected,
- said controller capable of selectively causing said plurality of demodulators and said plurality of signal adders to iteratively perform said interference cancellation processing cycle on all paths within the multipath channel.

4. The receiver as set forth in claim 1 wherein said controller causes said plurality of demodulators and said plurality of signal adders to perform a predetermined number of iterations of said interference cancellation processing cycle.

5. The receiver as set forth in claim 1 wherein said plurality of demodulators and said plurality of signal adders operate on unencoded symbols during said interference cancellation processing cycle.

6. For use in a wireless communications system, a method of successive user data multipath interference cancellation comprising the steps of:
- (a) storing samples from a wireless signal in a storage buffer;
- (b) estimating, within each of a plurality of demodulators each corresponding to one of a plurality of resolvable paths within a multipath channel in which the wireless signal is transmitted, interference from a corresponding resolvable path on a portion of the wireless signal transmitted along a selected path within the multipath channel and operating on encoded symbol;
- (c) subtracting the estimated interference on the wireless signal portion transmitted along the selected path from the wireless signal samples;
- (d) repeating steps (b) and (c) for all resolvable paths within the multipath channel to perform an interference cancellation processing cycle;
- (e) iteratively performing interference cancellation processing cycles on the wireless signal samples to reduce multipath interference within the wireless signal samples asymptotically to zero; and
- (f) estimating complex gains and timing delays for interference from each path on the wireless signal portion transmitted along a selected path.

7. The method as set forth in claim 6 further comprising:
- resolving each individual path for the multipath channel; and
- estimating channel parameters for the multipath channel to process the wireless signal during the initial demodulation.

8. For use in a wireless communications system, a method of successive user data multipath interference cancellation comprising the steps of:
- (a) storing samples from a wireless signal in a storage buffer;
- (b) estimating, within each of a plurality of demodulators each corresponding to one of a plurality of resolvable paths within a multipath channel in which the wireless signal is transmitted, interference from a corresponding resolvable path on a portion of the wireless signal transmitted along a selected path within the multipath channel;
- (c) subtracting the estimated interference on the wireless signal portion transmitted along the selected path from the wireless signal samples;
- (d) repeating steps (b) and (c) for all resolvable paths within the multipath channel to perform an interference cancellation processing cycle;
- (e) iteratively performing interference cancellation processing cycles on the wireless signal samples to reduce multipath interference within the wireless signal samples asymptotically to zero; and
- (f) producing an estimate of symbols transmitted on the wireless signal based on complex gains and timing delays for interference train each path on the wireless signal portion transmitted along the selected path.

9. The method as set forth in claim 6 further comprising:
- performing a predetermined number of interference cancellation processing cycle.

10. The method as set forth in claim 6 wherein steps (b) and (c) further comprise:
- operating on unencoded symbols.

11. For use in a wireless communications system, a portion of a receiver employed for successive user data multipath interference cancellation comprising:
- a storage buffer capable of selectively storing samples from a wireless signal;
- a plurality of demodulators each corresponding to one of a plurality of resolvable paths within a multipath channel in which said wireless signal is transmitted, each demodulator including a delay unit and a signal multiplier capable of being selectively employed to estimate interference from a corresponding resolvable path on a portion of said wireless signal transmitted along a selected path within said multipath channel;
- a plurality of signal adders each capable of selectively subtracting said estimated interference on said wireless signal portion transmitted along said selected path from said wireless signal samples;

a controller capable of selectively causing, for each selected path within said multipath channel, said plurality of demodulators and said plurality of signal adders to perform an interference cancellation processing cycle in which said plurality of demodulators each estimate interference from said corresponding path on said wireless signal portion transmitted along said selected path, and said plurality of signal adders each subtract said estimated interference on said wireless signal portion transmitted along said selected path from said wireless signal samples, each of said resolvable paths being selected in turn during said interference cancellation processing cycle until all resolvable paths have been selected, said controller capable of selectively causing said plurality of demodulators and said plurality of signal adders to iteratively perform said interference cancellation processing cycle on all paths within the multipath channel;

a unit combining outputs from all of said signal adders to produce a result for each interference cancellation processing cycle;

a decoder operating on said interference cancellation processing cycle result to generate an estimate of data transmitted by said wireless signal; and a encoder operating on said estimate of data transmitted by said wireless signal to produce a re-encoded estimated signal in a same manner as an encoder employed by a transmitter transmitting said wireless signal, wherein said re-encoded estimated signal is employed by said plurality of demodulators in estimating interference from said corresponding path on said wireless signal transmitted along said selected path.

12. For use in a wireless communications system, a method of successive user data multipath interference cancellation comprising the steps of;

(a) storing samples from a wireless signal in a storage buffer;

(b) estimating, within each of a plurality of demodulators each corresponding to one of a plurality of resolvable paths within a multipath channel in which the wireless signal is transmitted, interference from a corresponding resolvable path on a portion of the wireless signal transmitted along a selected path within the multipath channel;

(c) subtracting the estimated interference on the wireless signal portion transmitted along the selected path from the wireless signal samples;

(d) repeating steps (b) and (c) for all resolvable paths within the multipath channel to perform an interference cancellation processing cycle;

(e) iteratively performing interference cancellation processing cycles on the wireless signal samples to reduce multipath interference within the wireless signal samples asymptotically to zero;

(f) combining outputs from all of the plurality of signal adders to produce a result for an interference cancellation processing cycle;

(g) decoding the interference cancellation processing cycle result to generate an estimate of data transmitted by said wireless signal; and (h) encoding the estimate of data transmitted by the wireless signal in a same manner as an encoder employed by a transmitter transmitting the wireless signal to produce a re-encoded estimated signal, wherein the re-encoded estimated signal is employed in estimating interference from each path on a wireless signal portion transmitted along the selected path.

* * * * *